United States Patent
Chi et al.

(10) Patent No.: US 11,983,240 B2
(45) Date of Patent: May 14, 2024

(54) META FEW-SHOT CLASS INCREMENTAL LEARNING

(71) Applicant: HUAWEI TECHNOLOGIES CO., LTD., Shenzhen (CN)

(72) Inventors: Zhixiang Chi, North York (CA); Li Gu, Toronto (CA); Huan Liu, Kanata (CA); Yuanhao Yu, Markham (CA); Yang Wang, Winnipeg (CA); Jin Tang, Markham (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 368 days.

(21) Appl. No.: 17/527,295

(22) Filed: Nov. 16, 2021

(65) Prior Publication Data
US 2023/0153380 A1 May 18, 2023

(51) Int. Cl.
*G06N 3/08* (2023.01)
*G06F 18/21* (2023.01)
(Continued)

(52) U.S. Cl.
CPC ........ *G06F 18/213* (2023.01); *G06F 18/2148* (2023.01); *G06F 18/217* (2023.01);
(Continued)

(58) Field of Classification Search
CPC .......... G06N 3/045; G06N 3/08; G06N 3/088; G06N 3/084; G06N 3/047; G06N 20/00; G06N 3/0464; G06N 3/096; G06N 3/0455; G06N 3/048; G06N 3/09; G06N 3/0475; G06N 5/04; G06N 3/04; G06N 3/044; G06N 3/063; G06N 3/082; G06N 3/094; G06N 3/0985; G06V 10/82; G06V 10/764; G06V 10/774; G06V 40/174; G06V 10/776; G06V 10/454; G06V 40/168; G06V 10/778; G06T 2207/20081; G06T 2207/20084; G06T 11/60; G06T 13/40;
(Continued)

(56) References Cited

U.S. PATENT DOCUMENTS

| | | | |
|---|---|---|---|
| 2020/0151448 A1* | 5/2020 | Lin | G06V 20/64 |
| 2020/0226735 A1* | 7/2020 | Peng | G06V 10/82 |
| 2021/0117802 A1* | 4/2021 | Nguyen | G06N 3/04 |

OTHER PUBLICATIONS

Beaulieu et al. Learning to Continually Learn ECAI 2020.
(Continued)

*Primary Examiner* — Quan M Hua

(57) ABSTRACT

This disclosure provides for methods and system for meta few-shot class incremental learning. According to an aspect a method is provided. The method includes obtaining at least one weight attention map of a first network and updating weights of a second network using the at least one weight attention map, where the second network is a modulatory network. The method further includes generating at least one feature attention map of the second network based on the at least one weight attention map of the first network and a set of input images of at least one class. The method further includes generating at least one feature map of the first network based on the set of input images of the at least one class, and updating the at least one feature map of the first network based on the feature attention map of the second network.

20 Claims, 14 Drawing Sheets

(51) Int. Cl.
*G06F 18/213* (2023.01)
*G06F 18/214* (2023.01)
*G06F 18/243* (2023.01)
*G06N 3/045* (2023.01)
*G06V 10/94* (2022.01)

(52) U.S. Cl.
CPC ............ *G06F 18/243* (2023.01); *G06N 3/045* (2023.01); *G06N 3/08* (2013.01); *G06V 10/95* (2022.01)

(58) Field of Classification Search
CPC ....... G06T 11/001; G06T 13/80; G06T 17/00; G06T 7/11; G06T 1/20; G06T 7/32
See application file for complete search history.

(56) References Cited

OTHER PUBLICATIONS

Zhang et al. Few Shot Incremental Learning with Continually Evolved Classifiers. Apr. 2021.
Mazunder et al. Few Shot Lifelong Learning AAAI Mar. 2021.
Quadar et al. Weight Excitation with Built in Attention Mechanisms in Convolutional Neural Networks Aug. 2020.
Fan et al. Generalized Few Shot Objective Detection without Forgetting CVPR 2021.

* cited by examiner

Algorithm: A neuromodulated Meta-Learning algorithm (ANML)

Require: $\Gamma \leftarrow$ trajectory of $N$ sequential meta-training tasks
Require: $\theta^{NM} \leftarrow$ weights of the neuromodulatory network
Require: $\theta^P \leftarrow$ weights of the prediction network
Require: $\alpha, \beta \leftarrow$ learning-rate hyperparameters 1:   initialize $\theta^{NM}, \theta^P$
2:   for n = 1, 2, ... do    > meta-learning outer-loop
3:     $S_{traj} = \Gamma_n$    > trajectory for inner-loop training
4:     $S_{rem} \sim \Gamma$    > sample instances from all tasks to remember
5:     $\theta_0^P = \theta^P$    > create inner-loop copy of prediction net
6:     for i = 1, 2, ..., k do    > task-learning inner-loop
7:       $\theta_i^P \leftarrow \theta_{i-1}^P - \beta \nabla_{\theta_{i-1}^P} \mathcal{L}(\theta^{NM}, \theta_{i-1}^P, S_{traj})$    > SGD on $\theta_{i-1}^P$
8:     end for
9:     $\theta^{NM,P} \leftarrow \theta^{NM,P} - \alpha \nabla_{\theta^{NM,P}} \mathcal{L}(\theta^{NM}, \theta_k^P, S_{traj}, S_{rem})$
          > meta-update on $\theta^{NM}, \theta^P$ w.r.t final inner-loop $\theta_k^P$
10:   end for

Sample trajectory (line 3)

For each class, perform k updates (k sequential images) (lines 6–8)

The updated model is evaluated on seen K images + randomly sampled 64 images (line 9)

FIG. 5B

Algorithm: Pseudo Meta FSCIL

Require: $\alpha, \beta \leftarrow$ learning rates
Require: $\theta^P, \theta^M$: pre-trained weights
Require: $D^0$: training set of base classes 901: Initialize the models with pre-trained weights
902: while *not converged* do
903:     $D^s = \{(S^j, Q^j)\}_{j=0}^N$    ▷ Sample of a pseudo incremental sequence
904:     $Q^c = \emptyset$    ▷ empty cumulative query set
905:     for j = 0, 1, ..., N do    ▷ Loop through the whole sequence
906:         Warm-up $\theta_{fc}^{new}$    ▷Train only new FC nodes for a few epochs
907:         $\theta^{fc} =$ Concatenate $(\theta_{old}^{fc}, \theta_{new}^{fc})$    ▷ Merge the FC nodes
908:         for z = 1, ..., K do    ▷ Adapt $\theta^P$ and $\theta^{fc}$ to new session
909:             $\theta_z^{P,fc} = \theta_{z-1}^{P,fc} - \alpha \nabla_{\theta_{z-1}^{P,fc}} \mathcal{L}_{CE}(X_j^s, Y_j^s; \theta_{z-1}^P, \theta_{z-1}^M, \theta_{z-1}^{fc})$
910:         end for
911:         $Q^c = Q^c + Q^j$    ▷ Accumulate the query set at session j
912:     $\theta^{P,M} \leftarrow \theta^{P,M} - \beta \nabla_{\theta^{P,M}} \sum_{(X^q, Y^q) \in Q^c} \mathcal{L}_{CE}(X^q, Y^q; \theta_K^P, \theta_K^M, \theta_K^{fc})$
            ◁ Update meta parameters $\theta^{P,M}$ based on forgetting evaluation.
913:     end for
914: end while

(Testing stages: 906–910)

FIG. 9

| Method | Architecture | Top-1 accuracy at the final session of CIFAR100 |
|---|---|---|
| State of the art (SOTA) | | 49.14 |
| Replace SOTA with meta trained backbone 606 | | 49.38 |
| Baseline (without updating the backbone) | | 46.5 to 47.2 |
| +Pseudo Meta learning (PML) | ResNet 20 | 48.77 |
| +PML + 4 masks | | 49.64 |
| +PML + 4 masks + guided adaptation | | 49.87 |

FIG. 11

META FEW-SHOT CLASS INCREMENTAL LEARNING

CROSS-REFERENCE TO RELATED APPLICATIONS

This is the first application filed for the present disclosure.

FIELD OF THE DISCLOSURE

The present disclosure pertains to the field of machine learning, and in particular to methods and devices for meta few-shot class incremental learning.

BACKGROUND

Classic machine learning algorithms are normally developed to classify limited number of classes. Existing learning algorithms attempt to train models to learn new classes while preventing or reducing the forgetting of already learnt classes (e.g., old knowledge). However, these algorithms cannot effectively adapt a pre-trained model on novel classes without catastrophic forgetting of the old knowledge. So, finding the balance between adapting to new knowledge and preventing or minimizing the forgetting issue continues to be a challenge in the machine learning field. In addition to the balancing challenge, existing machine learning algorithms are further challenged to adapt to new knowledge due to the limited training samples with reflects the real world. Other limitations of existing algorithms also exist which are further described herein.

Therefore, there is a need for methods and devices for meta few-shot class incremental learning that obviates or mitigates one or more limitations of the prior art.

This background information is provided to reveal information believed by the applicant to be of possible relevance to the present disclosure. No admission is necessarily intended, nor should be construed, that any of the preceding information constitutes prior art against the present disclosure.

SUMMARY

This present disclosure provides methods and system for meta few-shot class incremental learning. According to a first aspect, a method is provided. The method includes obtaining at least one weight attention map of a first network. The method further includes updating weights of a second network using the at least one weight attention map of the first network, wherein the second network is a modulatory network. The method further includes generating at least one feature attention map of the second network based on the at least one weight attention map of the first network and a set of input images of at least one class. The method further includes generating at least one feature map of the first network based on the set of input images of the at least one class. The method further includes updating the at least one feature map of the first network based on the feature attention map of the second network. The method may provide for an enhanced model training in which the model's weight selection is learnt and is based on a current state of model's knowledge and incoming images for new classes.

In some embodiments, the first network is a prediction network. In some embodiments, the updating weights of the second network includes multiplying the weight of the second network with the at least one weight attention map of the first network. In some embodiments, the at least one weight attention map represents a current state of the first network, the current state indicating a learnt knowledge. The method may provide for leveraging known knowledge for model's weight selection. The model may provide a balance between learning new knowledge and maintaining old knowledge.

In some embodiments, the method further includes providing to the first network a set of training data indicative of n novel classes. In some embodiments, the method further includes adding n nodes to a classifier of the first network, wherein the classifier comprises one or more existing nodes indicative of one or more learnt classes of the at least one class, each of the existing node indicative of a learnt class. In some embodiments, the method further includes merging, via concatenation, the n nodes with the one or more existing nodes. In some embodiments, the method further includes updating the first network based on the set of training data. In some embodiments, the method further includes evaluating the updated first network based on test data indicative of the novel classes and learnt classes. The method may provide for an enhanced training based on simulated incremental learning. The method may provide for a learnable backbone of the model.

In some embodiments, the set of training data and the set of test data are from a set of sequential data. In some embodiments, the set of sequential data and the set if input images are from a set of base data indicative of base classes, bases classes comprising the n novel classes and the at least one class. The method may provide for alleviating the gap between learning new knowledge and forgetting the old knowledge.

In some embodiments, each of the first network and the second network is a deep neural network. The method may provide for training a scaled-up architecture (i.e., deep neural networks).

In some embodiments, wherein the n novel classes are from a different domain of classes than the at least one class. The method may provide training a model for applications based on different domains.

According to a second aspect, a second method is provided. The method includes, providing to a network a set of training data indicative of n novel classes. The method further includes adding n nodes to a classifier of the network, wherein the classifier comprises one or more existing nodes indicative of one or more learnt classes, each of the existing node indicative of a learnt class. The method further includes, merging, via concatenation, the n nodes with the one or more existing nodes. The method further includes updating the network based on the set of training data. The method further includes evaluating the updated network based on test data indicative of the novel classes and learnt classes. The method can provide for a simulated training in a sequential episode manner (i.e., incremental session). The method can provide for evaluation at each incremental session based on new knowledge learnt at the incremental session and old knowledge learnt from previous sessions. Accordingly, the method can provide for a model optimization that is aligned with the evaluation.

In some embodiments, the network is a prediction network. In some embodiments of the one or more foregoing aspects, the set of training data represents an n-way-k-shot classification problem. In some embodiments, the evaluating comprises: generating a loss function for the updated prediction network based on the test data. The method can provide for a better resistance against forgetting old knowledge.

In some embodiments of the one or more foregoing aspects, the updating the prediction network includes updating weight parameters of a backbone of the prediction network based on the set of training data.

In some embodiments of the one or more foregoing aspects, the method further includes updating weight parameters of a backbone of the prediction network based on the generated loss function. The method can provide for a learnable backbone that updates incrementally.

According to a third aspect, an apparatus is provided, where the apparatus includes modules configured to perform the methods in the one or more foregoing aspects.

According to a fourth aspect, an apparatus is provided, where the apparatus includes: a memory, configured to store a program; a processor, configured to execute the program stored in the memory, and when the program stored in the memory is executed, the processor is configured to perform the methods in the one or more foregoing aspects.

According to a fifth aspect, a computer readable medium is provided, where the computer readable medium stores program code executed by a device, and the program code is used to perform the method in the one or more foregoing aspects.

According to a sixth aspect, a computer program product including an instruction is provided. When the computer program product is run on a computer, the computer performs the method in the one or more foregoing aspects.

According to a seventh aspect, a chip is provided, where the chip includes a processor and a data interface, and the processor reads, by using the data interface, an instruction stored in a memory, to perform the methods in the one or more foregoing aspects.

Optionally, in an implementation, the chip may further include the memory. The memory stores the instruction, and the processor is configured to execute the instruction stored in the memory. When the instruction is executed, the processor is configured to perform the method in the first aspect.

According to an eighth aspect, an electronic device is provided. The electronic device includes an action recognition apparatus in any one or more foregoing aspects.

Other aspects of the disclosure provide for apparatus, and systems configured to implement the methods disclosed herein. For example, wireless stations and access points can be configured with machine readable memory containing instructions, which when executed by the processors of these devices, configures the device to perform the methods disclosed herein.

Embodiments have been described above in conjunction with aspects of the present disclosure upon which they can be implemented. Those skilled in the art will appreciate that embodiments may be implemented in conjunction with the aspect with which they are described but may also be implemented with other embodiments of that aspect. When embodiments are mutually exclusive, or are incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present disclosure will become apparent from the following detailed description, taken in combination with the appended drawings, in which:

FIGS. 5A and 5B illustrate a neuromodulated meta-learning method (ANML), in accordance with embodiments of the present disclosure.

FIG. 9 illustrates a pseudo meta few shot class incremental learning (FSCIL) method, in accordance with embodiments of the present disclosure.

FIG. 11 illustrates experimental results, in accordance with embodiments of present disclosure.

It will be noted that throughout the appended drawings, like features are identified by like reference numerals.

DETAILED DESCRIPTION

Figure 1:
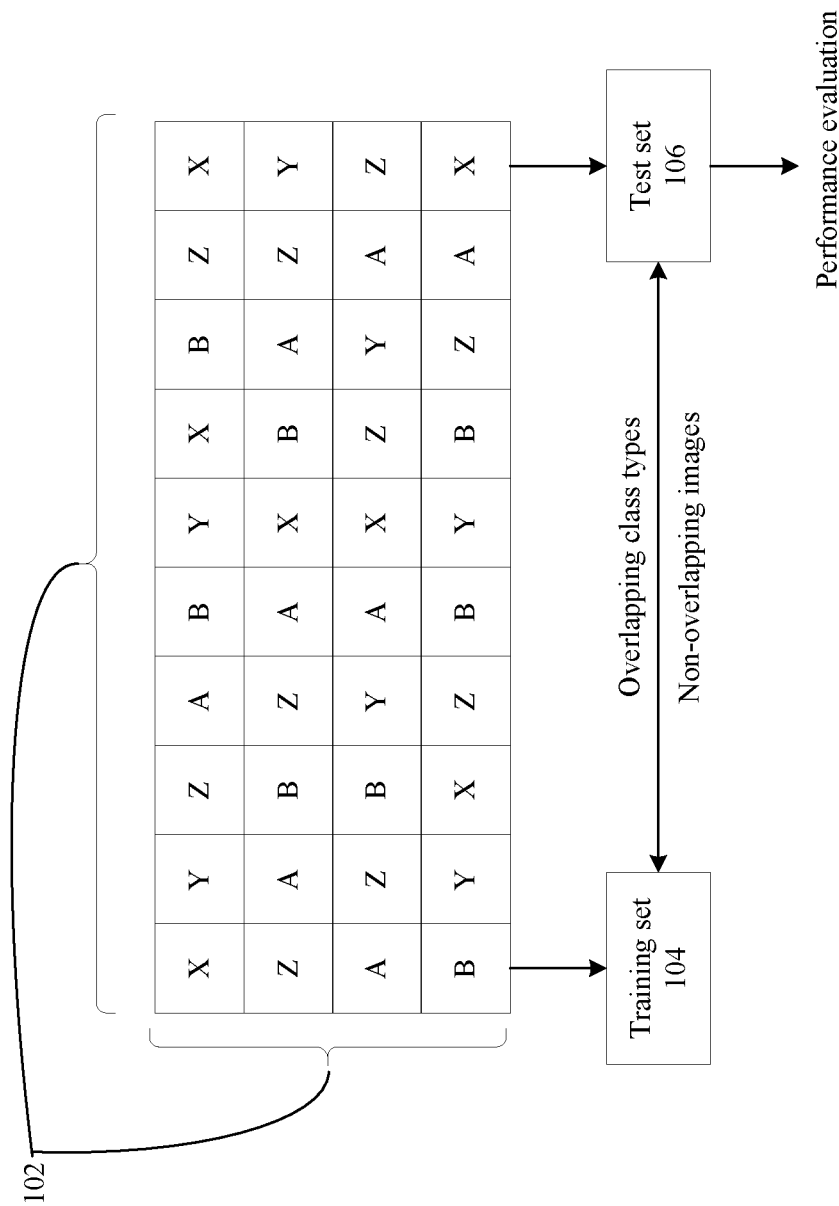
FIG. 1 illustrates a classic machine learning system for image classification, in accordance with embodiments of the present disclosure.

Classic machine learning algorithms are normally developed to classify pre-defined number of classes. FIG. 1 illustrates a classic machine learning system for image classification, in accordance with embodiments of the present disclosure. As shown in FIG. 1, the image dataset 102 is normally split into a training set 104 and a testing set 106, where the training set and the test data comprise have the same types of classes (e.g., same category ID), as may be appreciated by a pers skilled in the art. The dataset 102 is always independent and identically distributed (I.I.D). Typically, a model is trained on the training set 104 and tested on the testing set 106. Model evaluation is typically done on one set. During deployment, the model may only classify the classes it has seen during training. Therefore, the model may be incapable learning additional classes.

Figure 2:
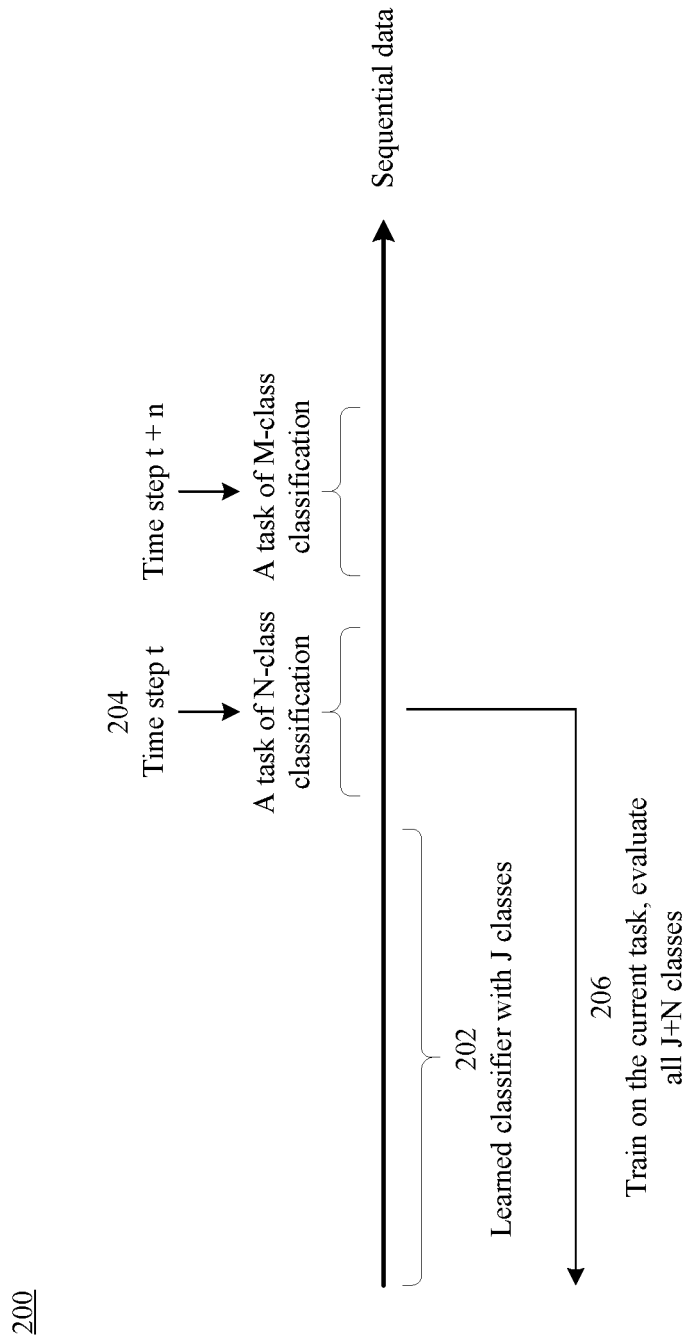
FIG. 2 illustrates a system for class incremental learning, in accordance with embodiments of the present disclosure.

Class incremental learning aims to allow the trained model to continually learn novel (new) classes during test time. FIG. 2 illustrates a system for class incremental learning, in accordance with embodiments of the present disclosure. The system 200 assumes a more realistic condition where data enters the system sequentially. Initially, at 202, a model may be trained with a dataset with J classes. After deployment, the trained model may be trained using data of novel classes. At each learning stage, the model may only be fed or trained with data for novel classes, and thus the model may only learn from the fed data. For example, at learning stage 204 associated with time step t, the model (having been trained with J classes) is trained based on a task of N-class classification. In addition to learning from the novel classes (e.g., N classes) based on the fed data at 204, the model is imposed to not forget the old classes (J classes).

Accordingly, after each training stage, the model is evaluated based on all classes it has been trained at the training stage and prior. For example, after learning stage 204 (associated with time step t), the model is evaluated, at 206, on all J+N classes. The model is expected to learn new classes (N-classes) but also not to forget the old classes (J classes). Accordingly, evaluation is done on test data of current and previous classes.

A challenge to the class incremental learning is that the novel classes (e.g., N classes) at each learning stage does not overlap with previous classes (e.g., J classes). Accordingly, the system 200 may be referred to as a non I.I.D.

Few-shot class incremental learning is another variant of class incremental learning with added conditions. In addition to the above-mentioned system 200, few-shot class incremental learning assumes that at each time step t (i.e., at each learning stage), the model can only see a few images for each novel class.

Figure 3:
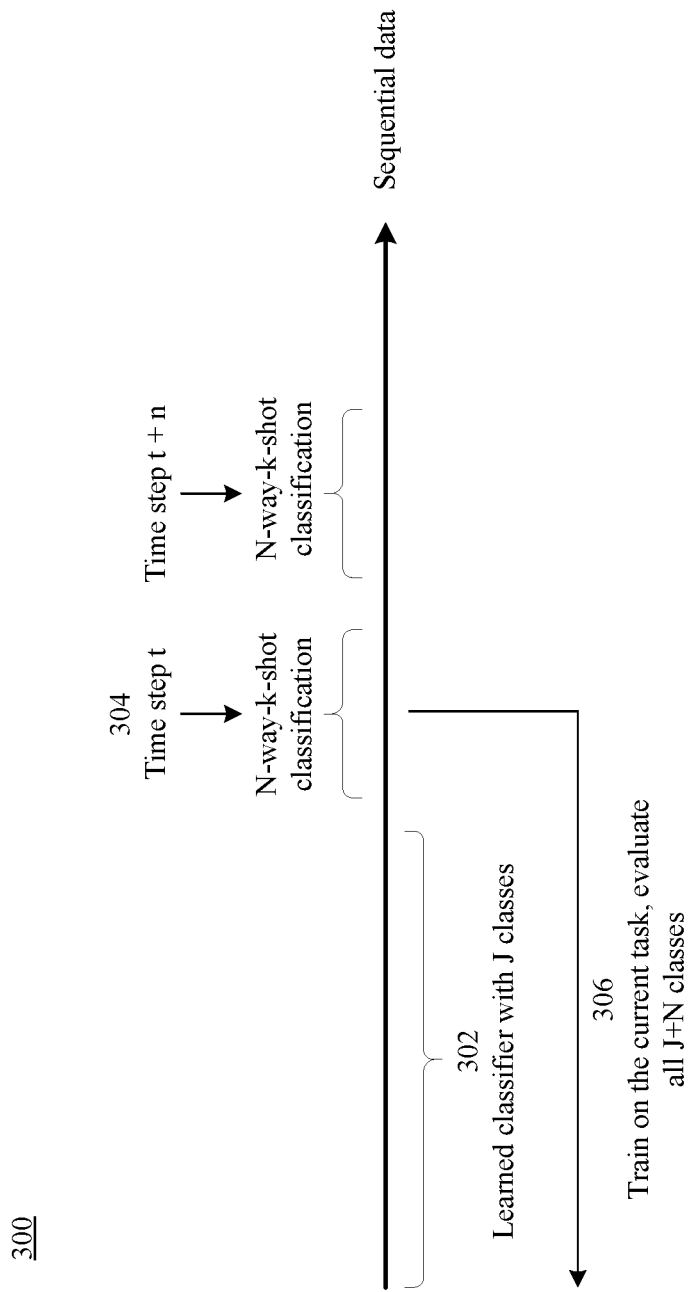
FIG. 3 illustrates a system for few-shot class incremental learning, in accordance with embodiments of the present disclosure.

FIG. 3 illustrates a system of device for few-shot class incremental learning in accordance with embodiments of the present disclosure. At each learning stage, the model may be trained to perform a new task of N-way k-shot classification problem. N-way k-shot classification problem may comprise N novel classes with k images for each class. Before deployment, at 302, the model may be trained using dataset of J classes. After deployment, at learning stage 304 associated with time step t, the model may be trained based on an N-way-k-shot classification problem. Thereafter, the model may be evaluated, at 306, based on all classes J and N classes.

The system 300 (few-shot class incremental learning) may be more practical than system 200 since users may only have a few images per new class for training. However, having few images per new class for training can lead to overfitting issues using the system 300. In addition, few-shot class incremental learning may suffer from the same limitations as other incremental learning techniques do, for example, catastrophic forgetting and capability to learn new knowledge with few training samples. Finding a balance between learning new knowledge and not forgetting the old knowledge continues to be a challenge for incremental learning techniques.

As may be appreciated by a person skilled in the art, there are trade-offs in addressing the limitations of prior art. In preserving the older knowledge (e.g., by allowing fewer model weights to be learnable), the model's adaptation capability may be limited. Similarly, by improving the model's adaptation capability (e.g., by allowing more model weights to be learnable), the old knowledge may be compromised or forgotten.

Figure 4:
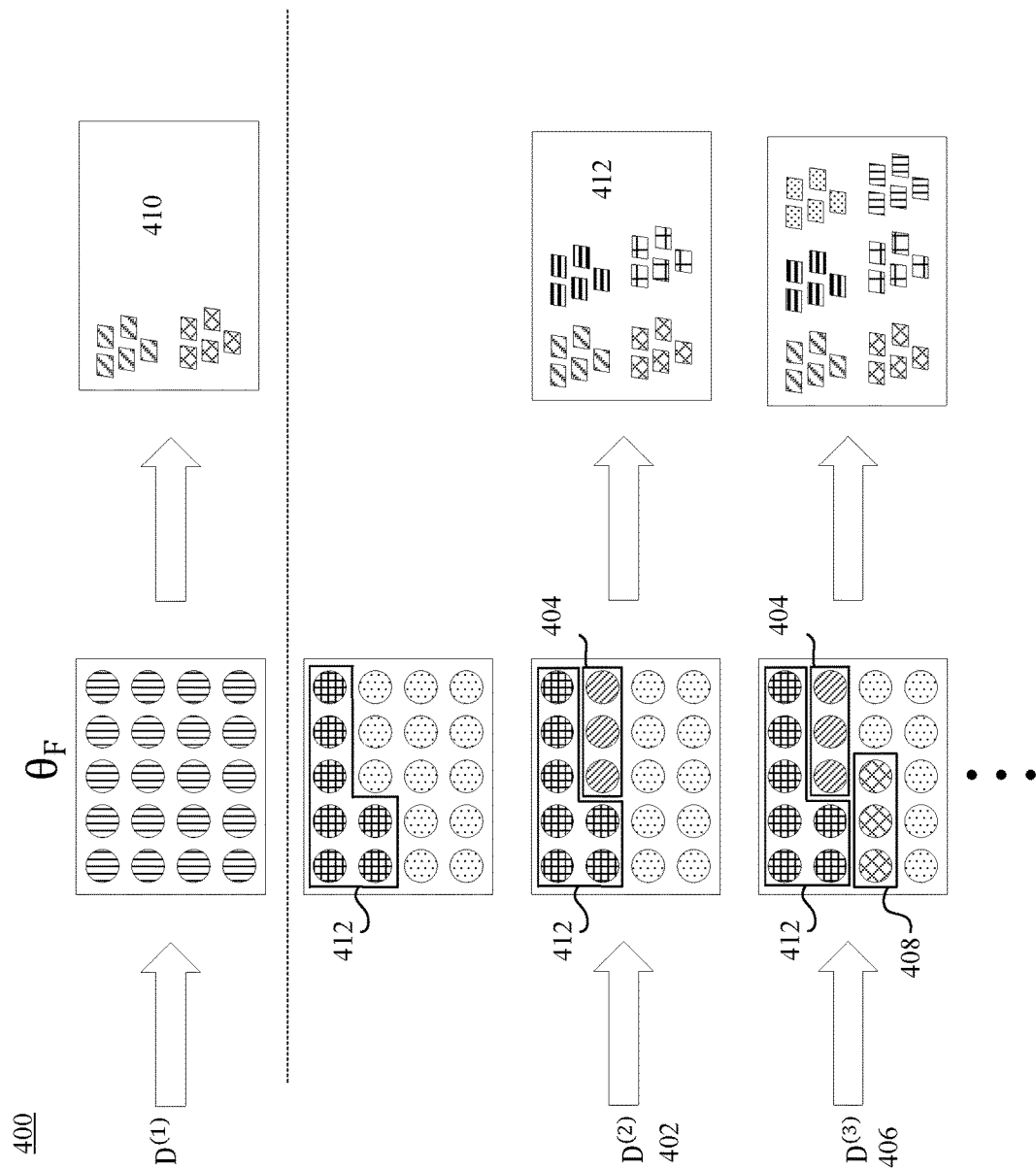
FIG. 4 illustrates a weight selective mechanism for updating new classes, in accordance with embodiments of the present disclosure.

FIG. 4 illustrates a weight selective mechanism for updating new classes, in accordance with embodiments of the present disclosure. The mechanism 400 may alleviate the challenge of forgetting old knowledge. At each incremental step D, 10% of the model parameters with lowest weight magnitude may be selected for training. The remaining parameters are fixed. The approach is based on the understanding that the old knowledge is encoded in the weights, particularly the ones with larger magnitude.

Accordingly, at incremental step $D^{(2)}$ 402, weights 404 may be selected for training. The old knowledge at 402 may be encoded in weights 412, the old knowledge being based on data 410. Similarly, at incremental step $D^{(3)}$ 406, weights 408 may be selected for training. The old knowledge at 406 may be encoded in weights 412 and 404, the old knowledge being based on data 412.

A first issue with weight selective mechanism is that the weight selection mechanism is hand-engineered (e.g., the metrics for selecting (magnitude), percentage of weights (10%)). The selection of weights considered of low magnitude is data dependent, which may vary from one class to another. Further, selecting low magnitude weights for training based on the understanding that low magnitude weights have lower impact on forgetting old knowledge may not be true as a general rule. A second issue with weight selective mechanism is that model optimization is not aligned with (directly related to) the aim to not forget old knowledge (forgetting issue) and learn new knowledge (adaptation issue).

Figure 5A:
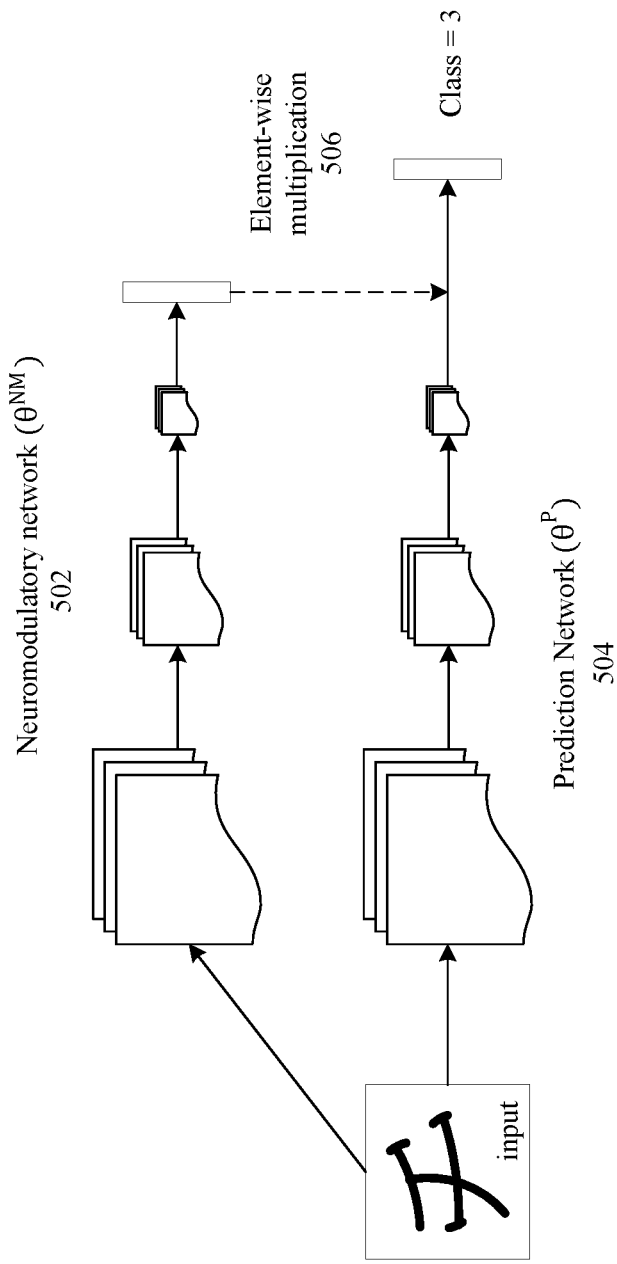

FIGS. 5A and 5B illustrate a neuromodulated meta-learning method (ANML). The ANML is a meta-learning approach that is based on auto weight selection for incremental learning. Referring to FIG. 5A, in ANML, the neuromodulatory network 502 automatically selects the weight in the prediction network 504 for updating. The neuromodulatory network generates a gating map to enable selective activation. The neuromodulatory network 502 produces and element-wise gating 506 of the prediction network' forward-pass activation, enabling selective activation of the prediction network. Based on the output of the neuromodulatory network 502, the important and non-important weights of the prediction network 504 can be determined. In comparison to the weight selective mechanism 400, the ANML automatizes the hand-engineering operations (e.g., weight selection for updating).

Referring to FIG. 5B, the algorithm attempts to simulate the test scenario using training data. Training data, new knowledge, is fed to the model sequentially and the model parameters are updated. Once the model is updated, the model is evaluated based on new knowledge and old knowledge. The evaluation is based on sampling of random images from old classes and new (future) classes. Thus, meta-optimization includes samples from the future time steps which may not be optimal for dealing with the forgetting issue. Further, the meta-optimization does not cover all the previous classes. As may be appreciated by a person skilled in the art, there are several limitations to the ANML technique.

A first limitation is that the feature extractor, i.e., the backbone in the prediction network 504, is fixed during test. So, the parameters of the backbone are not updated as the model network learns. A fixed backbone may further challenge the classifier in classifying an image, thereby limiting the performance of the overall model. Accordingly, embodiments described herein may provide for a learnable backbone.

A second limitation is that only last layer is gated, which limits the scalability of the technique. Since the ANML technique is based on the shallow networks, the technique is not as effective for deeper networks.

A third limitation is that the neural modulation network 502 is unaware of the current state of prediction network 504 (e.g., the extent of knowledge or classes learnt at each incremental step). So, the output 506 of the neuromodulatory network 502 tends to be the same, irrespective of the learning stage of the prediction network, which limits the model optimization.

Embodiments described herein may alleviate the limitations of few-shot class incremental learning for image classification including the forgetting issue (forgetting old knowledge) and adaptation (learning new knowledge). Embodiments described herein may use a bidirectional guided adaptation modules to guide the weight selection and training the model based on novel classes. Embodiments described herein may provide for a model learning method that learns new knowledge (novel classes) while being less prone to forgetting old knowledge (forgetting issue). In some embodiments, the learning method may be based on a meta-learning based algorithm.

Embodiments described herein may provide for a fully optimization based solution for few-shot class incremental learning. Embodiments described herein can utilizes a bi-level optimization stage from meta-learning to alleviate the gap between learning new knowledge and forgetting the old knowledge.

Figure 6:
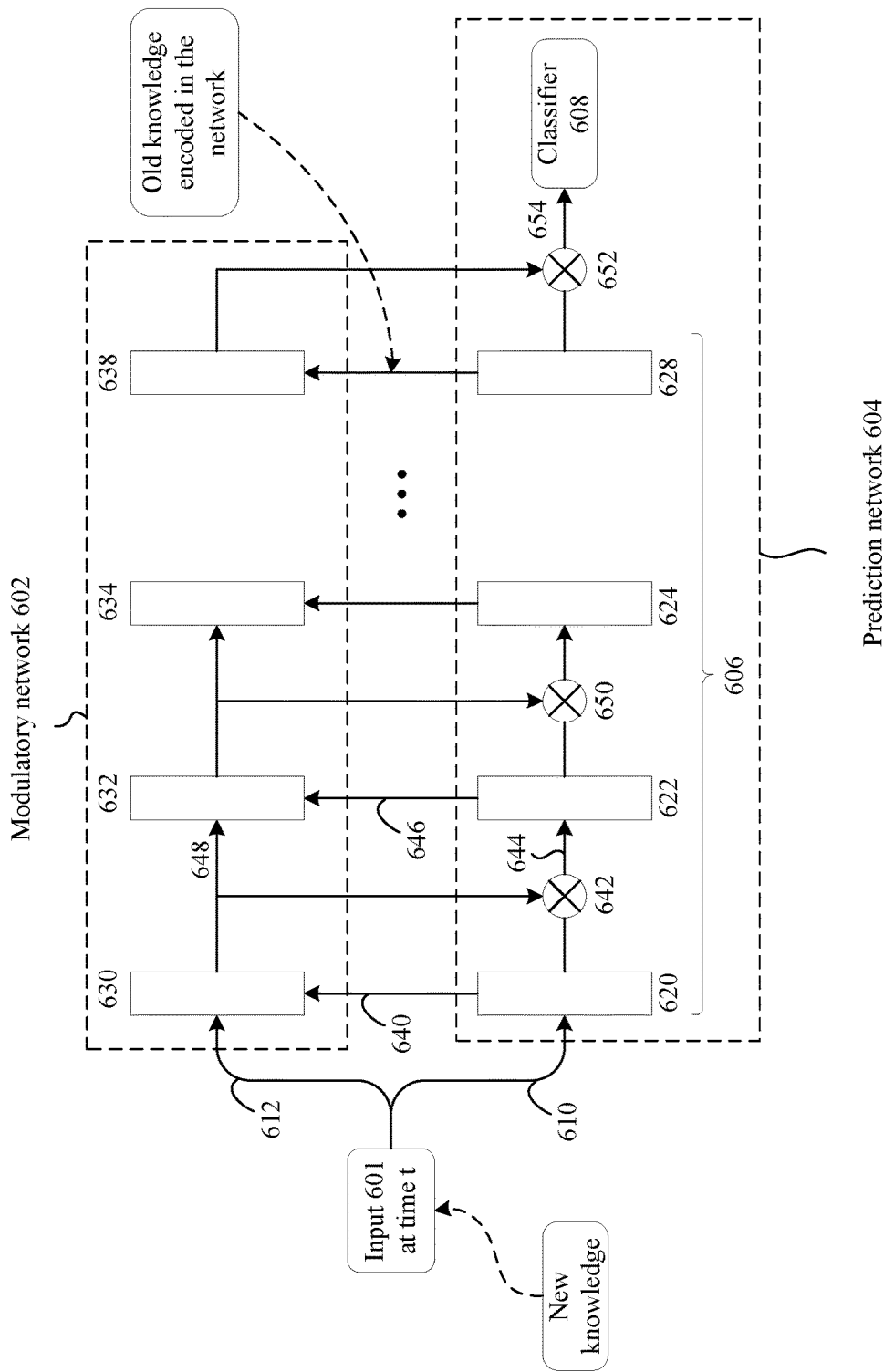
FIG. 6 illustrates an overall architecture of a learning method, in accordance with embodiments of the present disclosure.

Embodiments described herein may provide for an improved learning architecture for incremental learning. FIG. 6 illustrates an overall architecture of a learning method, in accordance with embodiments of the present disclosure. The architecture 600 can comprise a modulatory network 602 and prediction network 604. In some embodiments, the prediction network 604 can comprise a backbone 606 (e.g., a feature extractor) and a classifier 608. As may be appreciated by a person skilled in the art, each of the backbone network 606 and the modulatory network 602 may have the similar neural network structure (e.g., same number of layers, and same weight parameters).

The backbone 606 can comprise layers 620, 622, 624 and 628. Similarly, the modulatory network 602 can comprise layers 630, 632, 634, and 638. In an embodiment, the backbone network 606 and the modulatory network 602 can have corresponding layers configured to interact with each other via a bi-directional guided adaption mechanism as described in reference to FIG. 8A. For example, a first layer 620 of the backbone 606 may correspond with the first layer 630 of the modulatory network 602, together the layers 620 and 630 may be referred to as a pair of corresponding layers.

In some embodiments, the weights of backbone network (e.g., at each layer 620, 622, 624, . . . , 628) can already be encoded with old knowledge, since the weights of the prediction network (i.e., the backbone 606) encodes the learnt or old knowledge). Accordingly, the learnt or old knowledge can be encoded in weights associated with each backbone layer (e.g., 620, 622, 624, . . . , 628).

In an embodiment, at time t, the prediction network 606 and the modulatory network 602 can each be fed 610 and 612 with an input 601 (new knowledge). Input 601 can include, for example, set of image data indicating one or more novel classes.

In some embodiments, the weights associated with layer 620 of the backbone 606 can be updated based on the received input 610. Thereafter, information indicative of weights associated with the first layer 620 can be sent 640 to the corresponding first layer 630 of the modulatory network 602. The weight information can be sent in a form of an attention map (e.g., weight attention map).

The corresponding layer 630 can update its weight parameters based on the received weight attention map. In some embodiments the updating may be a multiplication operation. Thereafter, in some embodiments, the corresponding layer 630 can generate a feature attention map based on its updated weights and received input 601, the feature attention map indicating features of the input 601 based on the updated weights. Similarly, the layer 620 can generate a feature map based on its associated weights and the received input 601, the feature map indicating features of the input 601 based on the associated weights of layer 620. The generated feature attention map of layer 630 can be applied to the feature map of layer 620, via e.g., multiplication 642, as illustrated. As may be appreciated by a person skilled in the art, feature attention map and feature maps may be similar, but their value range can differ. As described, a feature attention map can indicate features of an input image and is an output of network layer (e.g., modulatory layer 630). A feature attention map may have values between [0,1]. A feature map may also indicate features of an input image and is an output of network layer (e.g., prediction layer 620). A feature map normally may have values beyond the range [0,1].

In some embodiments, a second layer 622 of the backbone receives 644 the combined feature map generated from multiplication 642. The weights of layer 622 can be communicated 646, as an associated weight attention map, to the corresponding layer 632 of the modulatory network 602, as illustrated. The corresponding layer 632 can receive 646 the weight attention map of layer 622 and can further receive 648 the feature attention map associated with layer 630, as illustrated. Based on the received 646 weight attention map and the received 648 feature attention map, the weights associated with layer 632 can be updated. A feature attention map associated with layer 632 can then be generated based on the updated weights of the layer 632. Similarly, layer 622 can generate a feature map based on its associated updated weights and the received 644 combined feature maps. The generated feature maps of layer 632 can be applied to the feature map of layer 622, via e.g., multiplication 650, as illustrated.

The same procedure as described in reference to corresponding pairs 632 and 622 can be performed with the remaining corresponding pairs (e.g., pair 634 and 624, . . . and pair 638 and 628). The feature maps generated by the last corresponding pairs 638 and 628 can be combined, (the generated feature attention map of layer 638 applied to the generated feature map of layer 628) via multiplication 652, and sent 654 to the classifier 608.

In some embodiments, at least one weight attention map of the prediction network 604 can be obtained. In some embodiments, the weights of the modulatory network 602 can be updated using the at least one weight attention map of the prediction network 604. In some embodiments, at least one feature attention map of the modulatory network 602 can be generated based on the at least one weight attention map of the prediction network 604 and a set of input images of at least one class (e.g., input 601). In some embodiments, at least one feature map of the prediction network 604 can be generated based on the set of input images of the at least one class. In some embodiments, the feature map of the prediction network 604 can be updated based on the feature attention map of the modulatory network.

Embodiments described in reference to FIG. 6 can provide for an improved architecture based on increased network depth and additional mode gated maps. Accordingly, embodiments described herein can provide for a scaled-up architecture in comparison to prior art. As may be appreciated by a person skilled in the art, prior art techniques are based on simple shallow networks, which can fail if applied to a deep neural network. Accordingly, embodiments described herein can apply to deep neural networks.

Figure 8A:
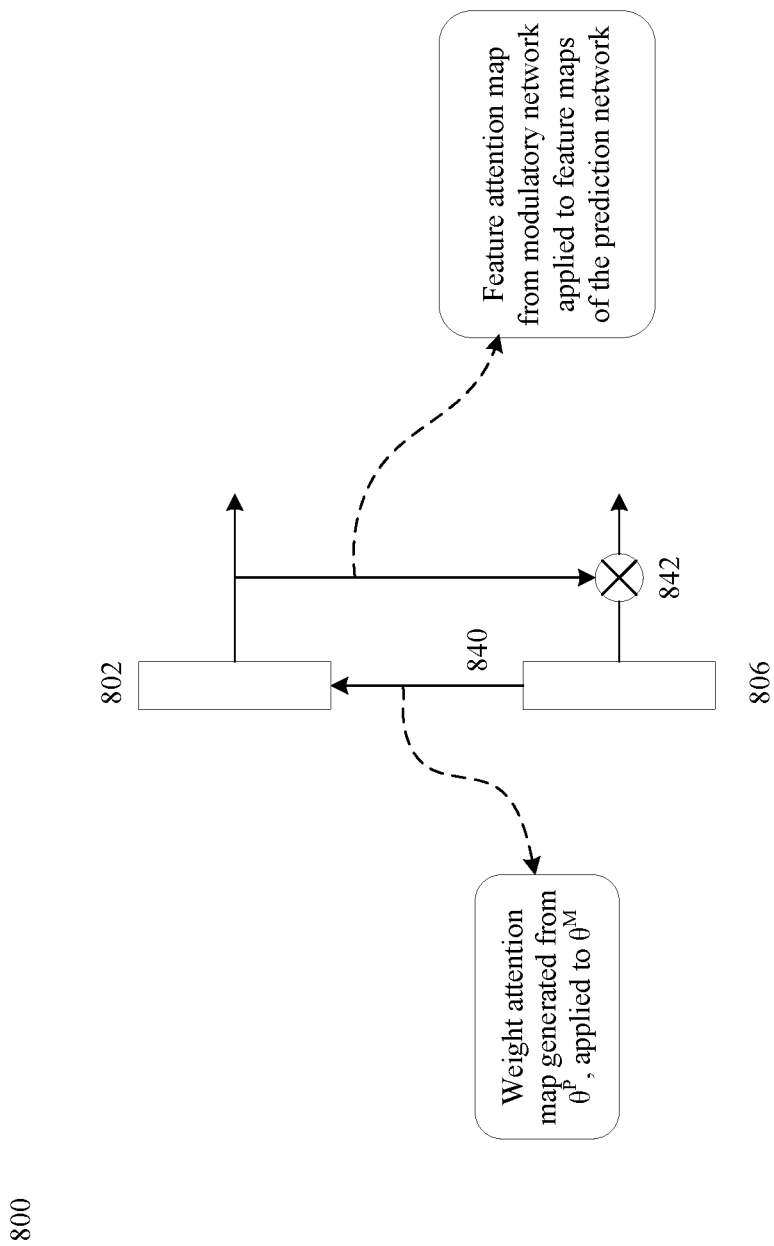
FIG. 8A illustrates a bi-directional guided adaptation module, in accordance with embodiments of the present disclosure.

Embodiments described herein may further provide for a bidirectional guided adaptation module, as described in reference to FIG. 8A, which allows the current state of the prediction network to be known by the neural modulation network 602. The current state of the prediction network may refer to the extent of learning the prediction network (e.g., the weights of layers of the backbone 606), which is communicated by each backbone layer to a corresponding modulatory layer as described herein.

Figure 7:
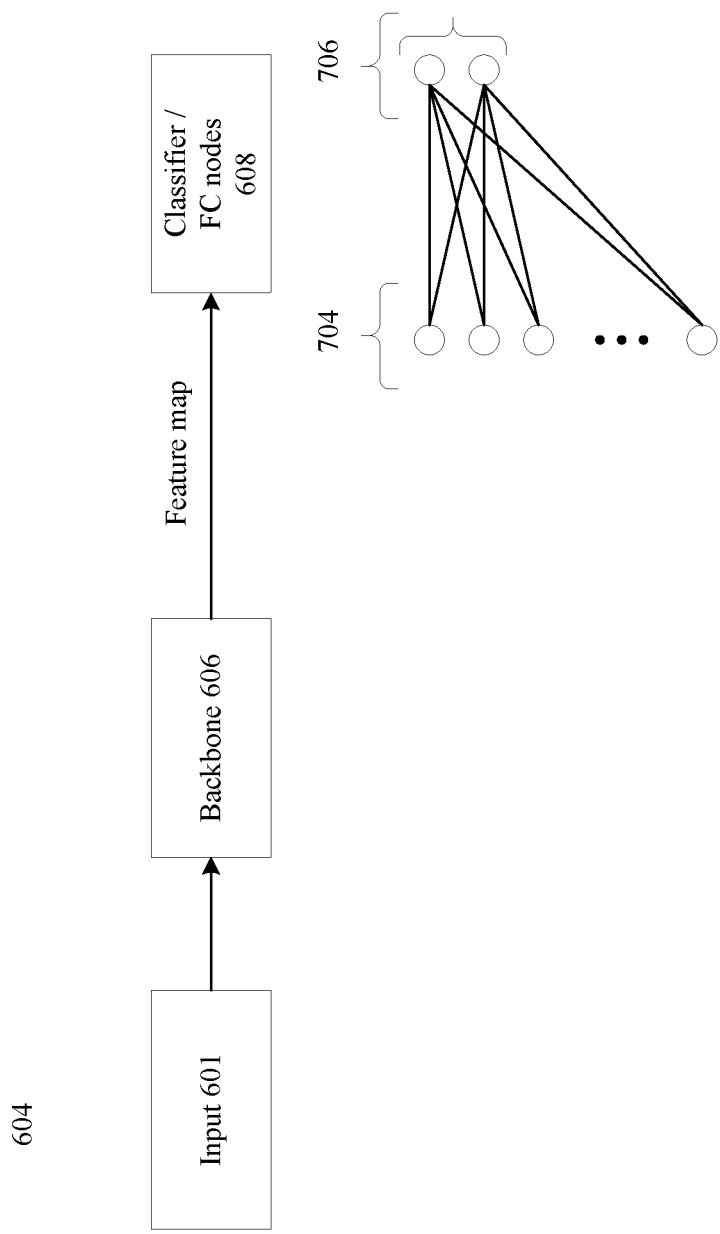
FIG. 7 illustrates an image classification model, in accordance with embodiments of the present disclosure.

FIG. 7 illustrates an image classification model, in accordance with embodiments of the present disclosure. The image classification model 700 can be similar to the prediction network 604. The model 700 can comprise a backbone 606 and a classifier 608 comprising a plurality of nodes. Each node can be associated with a respective unique class of data.

In some embodiments, the backbone 606 can comprise stacked convolutional layers. In some embodiments, the backbone 606 can comprise stacked convolutional layers followed by fully connected layers. The backbone 606 can be referred to as a feature extractor.

In an embodiment, an input 601 can be fed into the backbone 606. The backbone 606 can generate a feature map or a feature attention map based on the input image. The generated feature attention map or the feature map may indicate one or more nodes 704, each node indicative of a class of data (e.g., images). The feature map or feature attention map can be fed to the classifier 608. The classifier 608 can comprise one or more fully connected (FC) nodes (e.g., 704 and 706), each node indicative of a class of data.

In an embodiment, new classification FC nodes, e.g., 706, can be added to the classifier for training based on the training data (e.g., input 601). The number of newly added classification nodes can be based on the number of classes present in the training data, since each node can correspond to a respective class. Each newly added node of the can be fully connected to existing nodes as illustrated.

FIG. 8A illustrates a bi-directional guided adaptation module, in accordance with embodiments of the present disclosure. The module 800 may reflect procedure performed by each pair of corresponding layers (one layer from backbone 606 and one other from modulatory network 602) as described in reference to FIG. 6.

In an embodiment, a weight attention map (information indicative of the weights) of the layer 806 of the backbone 606 can be sent 840 to the corresponding layer 802 of the modulatory network 602. The corresponding layer 802 can update its weight parameters based on the received weight attention map. In some embodiments the updating may be a multiplication operation. Thereafter, in some embodiments, the corresponding layer 802 can generate a feature attention map based on its updated weights and received input 601. Similarly, the layer 806 can generate a feature map based on its associated weights and the received input (e.g., input 601). The generated feature attention map of the layers 802 can be applied to the generate feature map of the layer 806, via e.g., multiplication 842, as illustrated.

Referring to FIG. 6 and FIG. 8A, the parameters of prediction network $\theta^P$ (e.g., at each layer) are processed by a few fully-connected (FC) layers to generate a weight attention map. The weight attention map is then applied to the weight of modulation network $\theta^M$ (e.g., at each layer). The modulation network can accept the new knowledge (data of novel classes) and produce a feature attention map to be applied (e.g., via multiplication 842) to the feature map of prediction network (at each layer).

Figure 8B:
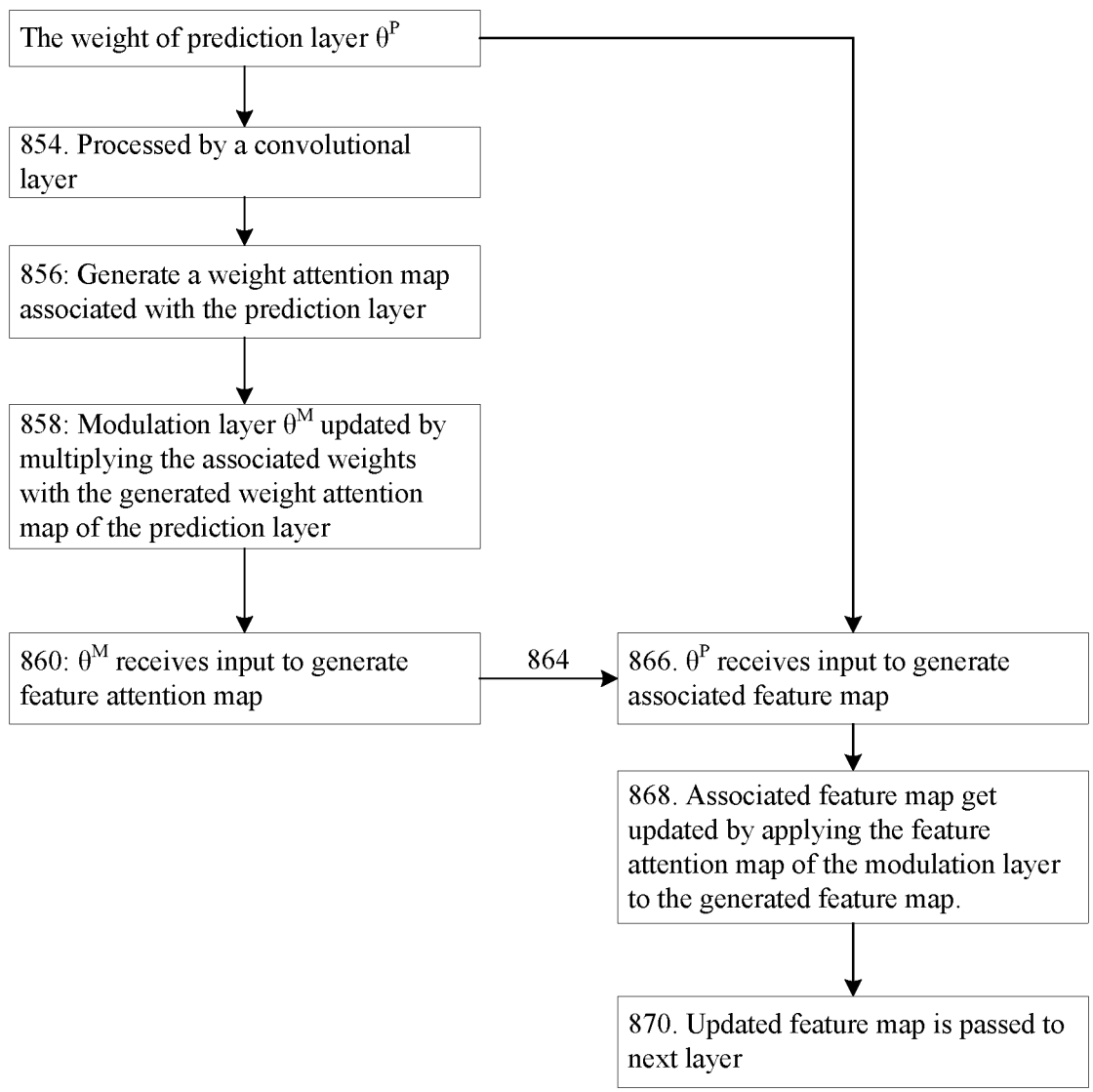
FIG. 8B illustrates a flowchart for bi-direction guided adaption, for a first layer, in accordance with embodiments of the present disclosure.

Accordingly, the prediction parameter $\theta^P$ can provide the current state of the prediction network (e.g., the old knowledge it has learnt.) The modulation network can combine the current state of the prediction network with the new knowledge to accommodate for the adaptation. The accommodation may refer to guiding the prediction network to make update FIG. 8B illustrates a flowchart for bi-direction guided adaption, for a first layer, in accordance with embodiments of the present disclosure. The flowchart of FIG. 8B may reflect embodiments described in reference to FIG. 8A and FIG. 6.

In an embodiment, at 854, the weight of prediction layer $\theta^P$ can be processed by a convolution layer. The prediction layer may refer to, for example, layer 806 of FIG. 8A. At 856, a weight attention map can be generated, the weight attention map representative of the weight of prediction layer.

In an embodiment, at 858, the weights of the modulation layer $\theta^M$ can be updated based on the generated weight attention map of the prediction layer. The weights of the modulation layer can be updated by multiplying the weights of the modulation layer with the generated weight attention map of the prediction layer. The modulation layer refers to the corresponding layer in the modulation network, e.g., layer 802 of the FIG. 8A.

In an embodiment, at 860, the modulation layer receives an input (e.g., input 601) to generate a feature attention map. At 864, the feature attention map associated with the modulation layer can be sent to prediction layer. At 866, the prediction layer can also receive the input (e.g., input 601) to generate a feature map based on weight of prediction layer.

In an embodiment, at 868, the generated feature map of the prediction layer can be updated, via multiplication, based on the generated feature attention map of the modulation layer. At 870, the updated feature map is then passed to the next layer.

As may be appreciated by a person skilled in the art, base classes refer to a large amount of data for each class. Training based on base classes can lead to a well-trained base model. Base classes training can be similar to off-line training (freedom to collect a large amount of data) to develop an effective classifier for the trained classes. Since test data is not available, a continuous learning can be simulated to evaluate the trained model, the simulation may be referred to as pseudo meta few shot class incremental learning (Pseudo Meta FSCIL). The Pseudo Meta FSCIL can be based on the method illustrated in FIG. 9.

FIG. 9 illustrates a pseudo meta few shot class incremental learning (FSCIL) method, in accordance with embodiments of the present disclosure. As mentioned herein, since for the current incremental steps are only available at test time, embodiments described herein can use the base classes to simulate the test incremental scenarios to train the model.

Referring to FIG. 9, inputs to the method 900 can include the learning rates ($\alpha$, $\beta$). The inputs can further include the pretrained weights for prediction network (0') and the modulatory network ($\theta^M$). The pretrained weights can be based on the base classes. The inputs can further include the training set of base classes ($D^0$) (e.g., images that can be collected offline).

The method 900 can include at 901 initializing the model with pre-trained weights. In some embodiments, the method can further include, at 903, sampling a set of data, from the base classes, to be used for simulating the incremental step. As mentioned herein, base data can be used to simulate sequential data for incremental learning. The sequential data $D^s$ can comprise pseudo training images ($S^j$) and query test images ($Q^j$). So, the model can be trained based on the pseudo training images ($S^j$) and tested on the query test images ($Q^j$). For each training epoch, a sequence of sessions is first sampled, each session involves new classes to be learnt.

The method can further include, at 904, resetting (e.g., emptying) the cumulative set (e.g., emptied). In some embodiments, the method can include training the model based on operations from 905 to 913. Operations 906 to 912 can be performed for each session of N sessions.

In some embodiments, at 906, an n number of new classification FC nodes can be added to the classifier (e.g., classifier 606 of the prediction network). The n new classification FC nodes can be based on the number of novel classes at each session. For example, if the sequence comprises a 5-way-5-shot classification problem (indicating 5 new classes with 5 images for each new class), then 5 new classification FC nodes can be added to the classifier. The n new classification FC nodes can be randomly initialized. Thereafter, only the n new classification FC nodes can be trained for a few epochs.

At 907, the new classification FC nodes can be combined, e.g., via concatenation, with the old classification FC nodes. Accordingly, the new nodes can be merged with the old nodes.

In some embodiments, after merging the new nodes with the old nodes, the whole model can be updated K times to adapt to the new session classes, which refers to operations 908 to 910. The updating can be based on the pseudo training image ($S^j$), which can comprise $X_j^s$ (referring to input) and $Y_j^s$ (referring to the input's label). After updating the whole model, the model is deemed to have learned the new knowledge at session j. Thus, the adapted model now has the ability to classify new classes.

In some embodiments, the adapted model, $\theta_z^{P,fc}$, can be evaluated based on the forgetting issue. To do so, at 911, the test set (query set) of the current session, at session j, can be accumulated to the cumulative set. Since, at time t, the training is based on the new image, evaluation should be performed based on all classes (old knowledge and new knowledge) that the model has seen, and thus all query images are accumulated. Thereafter, at 912, loss is computed based on the cumulative set to measure the forgetting issue. In some embodiments, the original model, $\theta^{P,M}$, can then be updated. The original model can be updated based on the computed gradient. Accordingly, the meta parameters $\theta^{P,M}$ can be updated based on the forgetting evaluation. The original model, which includes both the prediction and modulation network, refers to the model before adaptation (i.e., the model before 908).

In some embodiments, the method 900 is based on the bi-level meta-learning, which refers to 909 and 912. Bi-level meta-learning refers to enhanced model training based on updates according to 909 and further updates according to 912. The method can measure the level of forgetting on the adapted model. Thus, the method can ensure that the dilemma of adaptation and forgetting can be minimized.

As described herein, embodiments can simulate the incremental learning. At each time step t, n number of new classification FC node can be added to the classifier (e.g., classifier 606), where n can be based on the novel classes that model will be trained on at time step t (e.g., at each session j). Once the new nodes are added, the model (e.g., the new classification FC nodes) can be trained few times, e.g., K times. As may be appreciated by a person skilled in the art, the number of times (e.g., K times) that the model can be trained at each session may be based on a number that avoids the overfitting issue.

As mentioned, in some embodiments, the model can be trained, K times, based on the new knowledge (novel classes) at each session j. Since the model may have a tendency to forget old knowledge, in some embodiments, the trained model can be evaluated based on old knowledge to minimize the forgetting issue. Accordingly, after training, data from the old classes and new classes are accumulated for testing the model. In some embodiments, the adapted model can be evaluated based on the forgetting issue, i.e., based on data from old knowledge (old classes). In some embodiments, the adapted model can be evaluated on the new knowledge, on how well the model has adapted to the new knowledge.

Based on evaluation performance of the adapted model on old knowledge, the original model can be updated (e.g., weight parameters can be updated).

Figure 10:
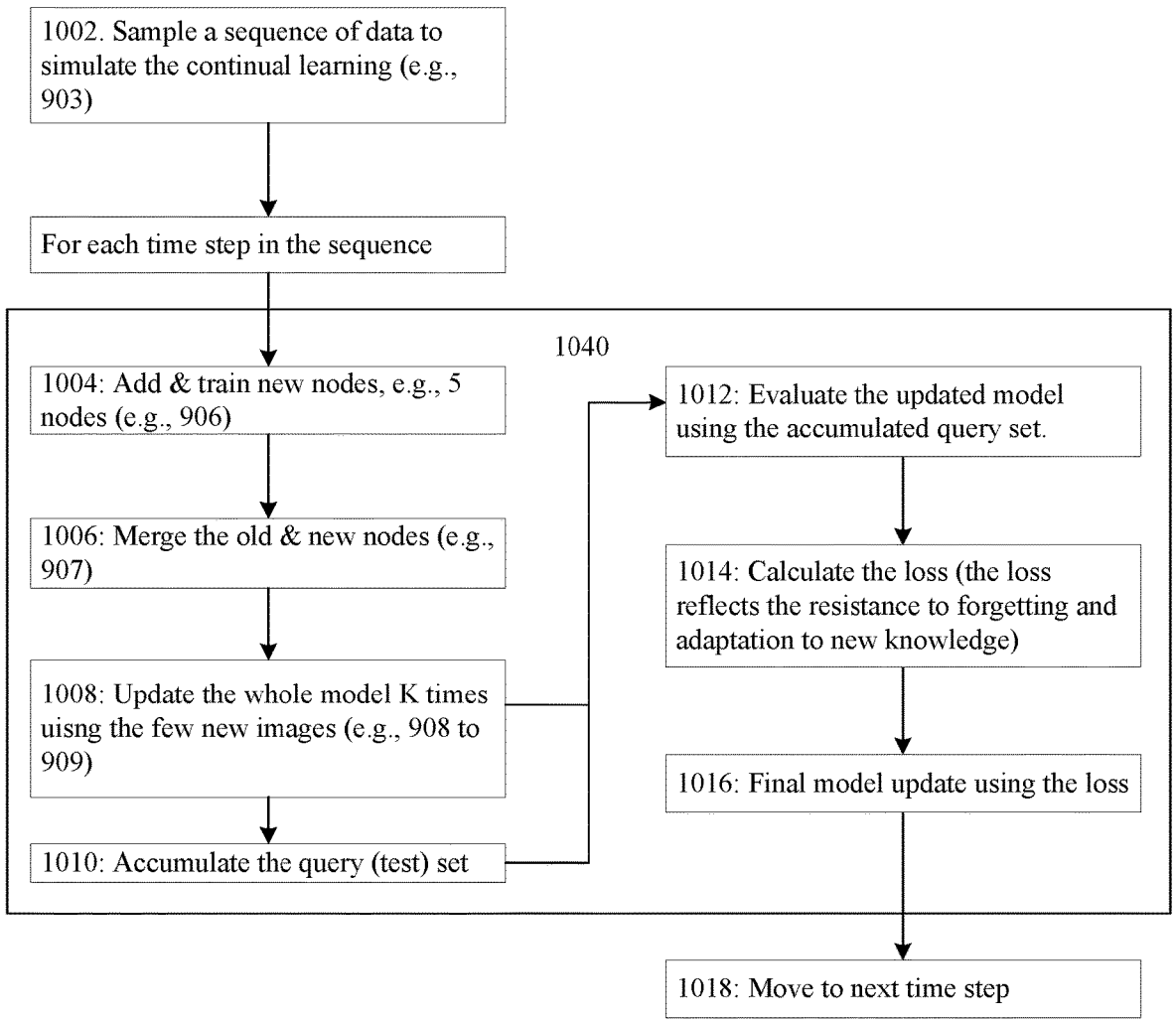
FIG. 10 illustrates a flowchart for the pseudo meta FSCIL, in accordance with embodiments of the present disclosure.

FIG. 10 illustrates a flowchart for the pseudo meta FSCIL, in accordance with embodiments of the present disclosure. The flowchart 100 may reflect embodiments described in reference to FIG. 9.

At 1002, a sequence of data can be sampled for simulating the continual learning. Embodiments described in reference to 1002 may reflect embodiments described in reference to 903.

For each time step in the sequence, at 1040, one or more operations described in reference to 1004, 1006, 1008, 1010, 1012, 1014, and 1016, can be performed.

At 1004, new classification FC nodes can be added to the classifier and trained. Embodiments described in reference to 1004 may reflect embodiments described in reference to 906. At 1006, the newly added nodes can be merged with the new nodes, similar to embodiments described in reference to 907.

In some embodiments, at 1008, the whole model can be updated K times using the few new images (indicative of the new classes) that is fed at this time step. Embodiments described in reference to 1008 may reflect the embodiments described in reference to 908 and 909.

In some embodiments, at 1010, the query (test) set can be accumulated, similar to the embodiments described in reference to 911. Thereafter, the adapted or updated model can be evaluated using the accumulated query set. At 1014, losses, e.g., cross-entropy losses, can be calculated. As may be appreciated by a person skilled in the art, the loss can reflect the resistance to forgetting old knowledge and adaptation to new knowledge. At 1016, the original model can be updated based on the calculated losses.

At 1018, the same procedure, e.g., procedure 1040, can be performed for the next time step. As may be appreciated by a person skilled in the art, the whole process can be repeated for some epochs, e.g., 100 epochs.

FIG. 11 illustrates experimental results, in accordance with embodiments of the present disclosure. As illustrated, replacing the current method (e.g., state of the art (SOTA)) with the metal trained backbone 606 can lead to improved performance. The experimental results (i.e., numbers shown in the table) are the top-1 accuracy at the final session of CIFAR100, which is a dataset for classification. The baseline means the model only pretrained on base classes and is directly evaluated in the incremental steps. PML means that after pretraining on the base classes, the model is further trained using embodiments described in reference to FIG. 9. In FIG. 11, "+4 masks" means that neural modulation has been applied in the prediction network" at 4 different places. "+ guided adaptation" means that bi-directional guided neural modulation has been added to the prediction network.

Embodiments described herein may provide for an enhanced model optimization, which involves less hand-engineering design compared to the prior art. Embodiment described herein may provide for a fully learned training method. The fully learned indicates that the neural modulation is learnt to perform the weight selection mechanism (instead of hand-engineered) as described herein. Embodiments described herein can provide for learnable layers (e.g., each layer is learnable) with improved performance with respect to overfitting (to new classes) and forgetting old knowledge. Embodiments described herein can provide for a balanced trade-off between forgetting and adaptation. Embodiments described herein can provide for an automatic weight selection mechanism.

Embodiments described herein may provide for a bidirectional guided adaptation module that can guide the updating of the prediction network using the modulation network.

Embodiments described herein can provide for a simulated training in a sequential episode manner (i.e., incremental session). Embodiments described herein can provide for evaluation at each incremental session based on new knowledge learnt at the incremental session and old knowledge learnt from previous sessions. Accordingly, embodiments can provide for a model optimization that is aligned with the evaluation. Embodiments described herein may provide for a bi-level optimization that resists the forgetting issue after adaptation. Bi-level optimization refers to enhanced training based on updates according to 909 and further updates according to 912

Embodiments described herein can have applications in which the incremental classes have larger domain gap compared to the base training classes. Such applications reflect the real-world scenarios, where users may incrementally add new classes from different domains. Since, data collected for training cannot cover classes for all users, the model can be pre-trained with the capability to continue to learn. The pre-trained model can be incrementally trained based on data collected by a user with manual labelling. Accordingly, the pre-trained model can become a user personalized model based on user-data incremental learning.

Figure 12:
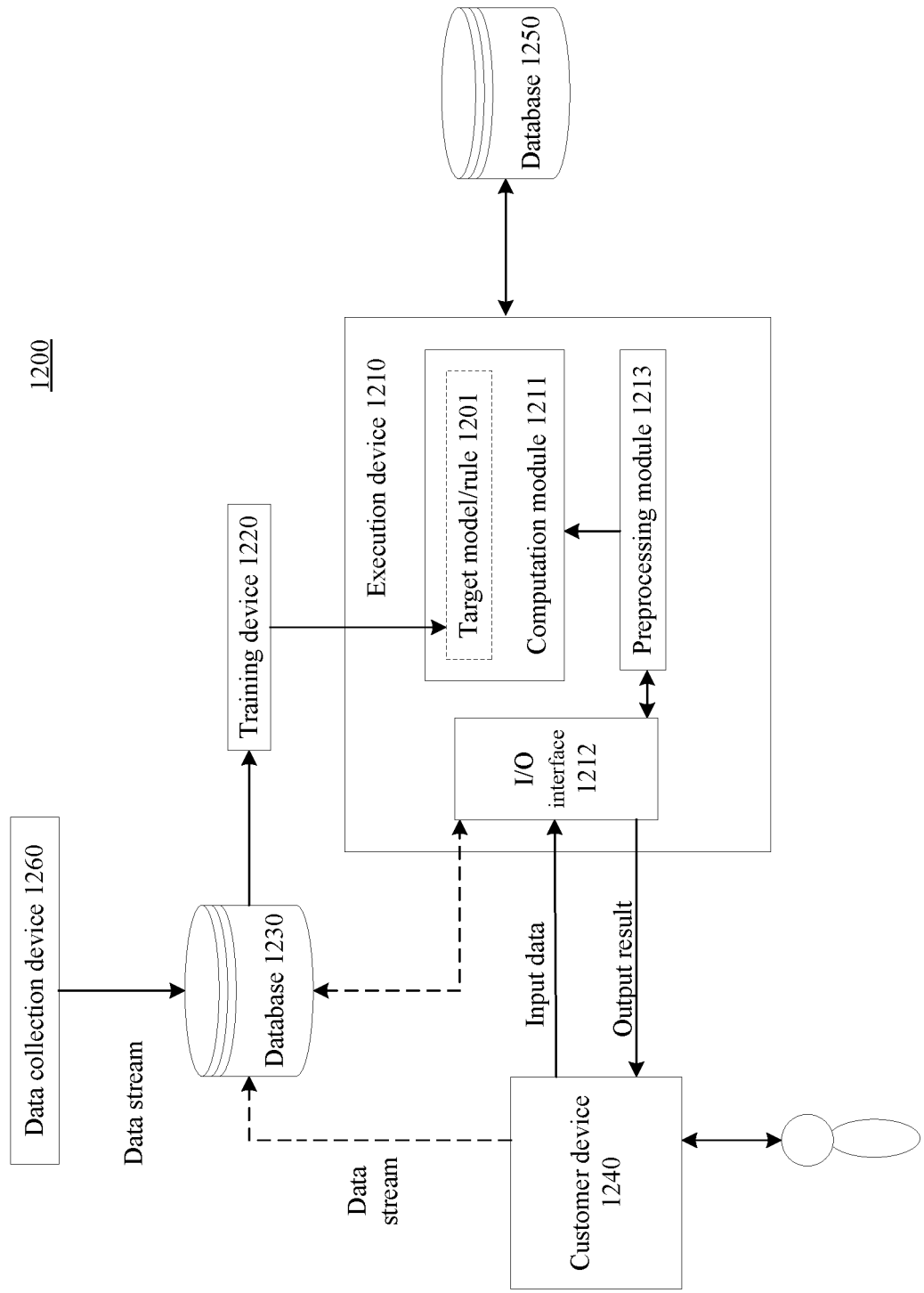
FIG. 12 illustrates a schematic structural diagram of a system architecture, in accordance with embodiments of the present disclosure.

FIG. 12 is a schematic structural diagram of a system architecture, in accordance with embodiments of the present disclosure. As shown in the system architecture 1200, a data collection device 1260 is configured to collect data and store the data into a database 1230. The stored data can included training data and test data as described herein. A training device 1220 generates a target model or rule 1201 based on the training data maintained in the database 1230. The target model or rule 1201 may refer to the trained network described herein, e.g., backbone network, the prediction network, and other networks used in the different embodiments herein.

Optionally, the one or more methods described herein may be processed by a CPU, or may be jointly processed by a CPU and a GPU, or may not be processed by a GPU, but processed by another processor that is applicable to neural network computation. This is not limited in this application.

The target model 1201 may be used for downstream tasks (e.g., one or more embodiments described herein A downstream task may be for example an image classification task. In an embodiment, the input data to the model may be input images and the outputs may be a customized trained model.

In some embodiments, the data maintained in the database 1230 is not necessarily collected by the data collection device 1260, but may be obtained through reception from another device. it should be noted that the training device 1220 does not necessarily perform the training and optimization with the target model or rule 1201 fully based on the data maintained by the database 1230, but may perform model training on data obtained from a cloud end or another place. The foregoing description shall not be construed as a limitation to this embodiment of the disclosure.

The target module/rule 1201 obtained through training by the training device 1220 may be applied to different systems or devices, for example, applied to an execution device 1210. The execution device 1210 may be a terminal, for example, a mobile terminal, a tablet computer, a notebook computer, AR/VR, or an in-vehicle terminal, or may be a server, a cloud end, or the like. The execution device 1210 is provided with an I/O interface 1212, which is configured to perform data interaction with an external device. A user may input data to the I/O interface 1212 by using a customer device 1240.

A preprocessing module 1213 may be configured to perform preprocessing based on the input received from the I/O interface 1212.

In a related processing process in which the execution device 1210 performs preprocessing on the input data or the computation module 1211 in the execution device 110 performs computation, the execution device 1210 may invoke data, code, or the like from a data storage system 1250, to perform corresponding processing, or may store, in a data storage system 1250, data, an instruction, or the like obtained through corresponding processing.

The I/O interface 1212 may return a processing result to the customer device 1240 and provides the processing result to the user. It should be noted that the training device 1220 may generate a corresponding target model/rule 1201 for different targets or different tasks (tasks described herein) based on different training data.

In some embodiments, the user may manually specify input data by performing an operation on a screen provided by the I/O interface 1212. In another case, the customer device 1240 may automatically send input data to the I/O interface 1212. If the customer device 1240 needs to automatically send the input data, authorization of the user needs to be obtained. The user can specify a corresponding permission in the customer device 1240. The user may view, in the customer device 1240, the result output by the execution device 1210. A specific presentation form may be display content, a voice, an action, and the like. In addition, the customer device 1240 may be used as a data collector, to collect, as new sampling data, the input data that is input to the I/O interface 1212 and the output result that is output by the I/O interface 1212, and store the new sampling data into the database 1230. The data may not be collected by the customer device 1240, but the I/O interface 1212 may directly store, as new sampling data into the database 1230, the input data that is input to the I/O interface 1212 and the output result that is output from the I/O interface 1212.

It should be noted that FIG. 12 is merely a schematic diagram of a system architecture according to an embodiment of the present disclosure. Position relationships between the device, the component, the module, and the like that are shown do not constitute any limitation. For example, the data storage system 1250 is an external memory relative to the execution device 1210. In another case, the data storage system 1250 may be located in the execution device 1210.

An aspect of the disclosure provides for a method. The method includes obtaining at least one weight attention map of a first network. The method further includes updating weights of a second network using the at least one weight attention map of the first network, wherein the second network is a modulatory network. The method further includes generating at least one feature attention map of the second network based on the at least one weight attention map of the first network and a set of input images of at least one class. The method further includes generating at least one feature map of the first network based on the set of input images of the at least one class. The method further includes updating the at least one feature map of the first network based on the feature attention map of the second network.

In some embodiments, the method further includes generating a first weight attention map of a first layer of the first network, the first weight attention map representing weight parameters associated with the first layer of the first network. In some embodiments, the method further includes updating weight parameters of a corresponding first layer of the second network based on the first weight attention map. In some embodiments, the method further includes generating a first feature attention map based on the updated weight parameters of the corresponding first layer and the set of input images. In some embodiments, the method further includes generating a first feature map based on the weight parameters of the first layer and a set of input images. In some embodiments, the method further includes generating a second feature map based on a multiplication of the first feature attention map and the first feature map. The method may provide for learnable layers with improved performance with respect to overfitting and forgetting old knowledge.

In some embodiments, the method further includes generating a respective weight attention map for each remaining layer of the first network, the respective weight attention map representing weight parameters of said each reaming layer of the first network. In some embodiments, the method further includes updating weight parameters of each reaming layer of the second network, the updating for each remaining layer of the second network based on the respective weight attention map of the corresponding layer of the remaining layers of the first network. In some embodiments, the method further includes generating a respective feature attention map associated with each remaining layer of the second network. In some embodiments, the method further includes generating a respective feature map associated with each remaining layer of the first network. In some embodiments, the method further includes generating a respective combined feature map based on the respective feature attention map and the respective feature map.

A convolutional neural network (CNN) is a deep neural network with a convolutional structure, and is a deep learning (deep learning) architecture. The deep learning architecture indicates that a plurality of layers of learning is performed at different abstraction layers by using, for example, a machine learning algorithm. As a deep learning architecture, the CNN is a feed-forward (feed-forward) artificial neural network. Each neural cell in the feed-forward artificial neural network may respond to an input (e.g., image) to the neural cell.

It may be understood by a person skilled in the art that, for the purpose of convenient and brief description, for a detailed working process of the foregoing system, apparatus, and unit, refer to one or more corresponding embodiments described herein, and details are not described herein again.

In the several embodiments provided in this application, it should be understood that the disclosed system, apparatus, and method may be implemented in other manners. For example, the described apparatus embodiment is merely an example. For example, a plurality of units or components may be combined or integrated into another system, or some features may be ignored or not performed. In addition, the displayed or discussed communication connections may be implemented by using some interfaces. The indirect communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure, or the part contributing to the prior art, or some of the technical solutions may be implemented in a form of a software product. The software product may be stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a USB flash drive, a removable hard disk, a read-only memory (Read-Only Memory, ROM), a random-access memory (Random Access Memory, RAM), a magnetic disk, or an optical disc.

Embodiments of the present invention can be implemented using electronics hardware, software, or a combination thereof. In some embodiments, the invention is implemented by one or multiple computer processors executing program instructions stored in memory. In some embodiments, the invention is implemented partially or fully in hardware, for example using one or more field programmable gate arrays (FPGAs) or application specific integrated circuits (ASICs) to rapidly perform processing operations.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Further, each operation of the method may be executed on any computing device, such as a personal computer, server, PDA, or the like and pursuant to one or more, or a part of one or more, program elements, modules or objects generated from any programming language, such as C++, Java, or the like. In addition, each operation, or a file or object or the like implementing each said operation, may be executed by special purpose hardware or a circuit module designed for that purpose.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

It will be appreciated that, although specific embodiments of the technology have been described herein for purposes of illustration, various modifications may be made without departing from the scope of the technology. The specification and drawings are, accordingly, to be regarded simply as an illustration of the disclosure as defined by the appended claims, and are contemplated to cover any and all modifications, variations, combinations or equivalents that fall within the scope of the present disclosure. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Although the present disclosure has been described with reference to specific features and embodiments thereof, it is evident that various modifications and combinations can be made thereto without departing from the disclosure. The specification and drawings are, accordingly, to be regarded simply as an illustration of the disclosure as defined by the appended claims, and are contemplated to cover any and all modifications, variations, combinations or equivalents that fall within the scope of the present disclosure.

What is claimed is:

1. A method comprising:
   obtaining at least one weight attention map of a first network;
   updating weights of a second network using the at least one weight attention map of the first network, wherein the second network is a modulatory network;
   generating at least one feature attention map of the second network based on the at least one weight attention map of the first network and a set of input images of at least one class;
   generating at least one feature map of the first network based on the set of input images of the at least one class; and
   updating the at least one feature map of the first network based on the feature attention map of the second network.

2. The method of claim 1, wherein the first network is a prediction network.

3. The method of claim 1, wherein the updating weights of the second network comprises multiplying the weight of the second network with the at least one weight attention map.

4. The method of claim 1, wherein the at least one weight attention map represents a current state of the first network, the current state indicating a learnt knowledge.

5. The method of claim 1 further comprising:
   providing to the first network a set of training data indicative of n novel classes;
   adding n nodes to a classifier of the first network, wherein the classifier comprises one or more existing nodes indicative of one or more learnt classes of the at least one class, each of the existing node indicative of a learnt class;
   merging, via concatenation, the n nodes with the one or more existing nodes;
   updating the first network based on the set of training data; and
   evaluating the updated first network based on test data indicative of the novel classes and learnt classes.

6. The method of claim 5, wherein the set of training data and the set of test data are from a set of sequential data.

7. The method of claim 6, wherein the set of sequential data and the set if input images are from a set of base data indicative of base classes, bases classes comprising the n novel classes and the at least one class.

8. The method of claim 1 wherein each of the first network and the second network is a deep neural network.

9. The method of claim 5, wherein the n novel classes is from a different domain of classes than the at least one class.

10. A method comprising:
    providing to a network a set of training data indicative of n novel classes;
    adding n nodes to a classifier of the network, wherein the classifier comprises one or more existing nodes indicative of one or more learnt classes, each of the existing node indicative of a learnt class;
    merging, via concatenation, the n nodes with the one or more existing nodes;
    updating the network based on the set of training data; and
    evaluating the updated network based on test data indicative of the novel classes and learnt classes.

11. The method of claim 10, wherein the network is a prediction network.

12. The method of claim 10, wherein the set of training data represents an n-way-k-shot classification problem.

13. The method of claim 10, wherein the evaluating comprises: generating a loss function for the updated prediction network based on the test data.

14. The method of claim 10 wherein the updating the prediction network comprises:
    updating weight parameters of a backbone of the prediction network based on the set of training data.

15. The method of claim 13 further comprising:
    updating weight parameters of a backbone of the prediction network based on the generated loss function.

16. A device comprising at least one processor and at least one non-transitory machine-readable medium storing executable instructions which when executed by the at least one processor configure the device for:
    obtaining at least one weight attention map of a first network;
    updating weights of a second network using the at least one weight attention map of the first network, wherein the second network is a modulatory network;
    generating at least one feature attention map of the second network based on the at least one weight attention map of the first network and a set of input images of at least one class;
    generating at least one feature map of the first network based on the set of input images of the at least one class; and
    updating the at least one feature map of the first network based on the feature attention map of the second network.

17. The device of claim 16, wherein the at least one weight attention map represents a current state of the first network, the current state indicating a learnt knowledge.

18. The device of claim 16, wherein the at least one processor further configures the device for:
    providing to the first network a set of training data indicative of n novel classes;
    adding n nodes to a classifier of the first network, wherein the classifier comprises one or more existing nodes indicative of one or more learnt classes of the at least one class, each of the existing node indicative of a learnt class;

merging, via concatenation, the n nodes with the one or more existing nodes;

updating the first network based on the set of training data; and evaluating the updated first network based on test data indicative of the novel classes and learnt classes.

19. The device of claim 18, wherein the evaluating comprises: generating a loss function for the updated prediction network based on the test data.

20. The device of claim 19, wherein the at least one processor further configures the device for updating weight parameters of a backbone of the prediction network based on the generated loss function.

\* \* \* \* \*

UNITED STATES PATENT AND TRADEMARK OFFICE
CERTIFICATE OF CORRECTION

| | | |
|---|---|---|
| PATENT NO. | : 11,983,240 B2 | Page 1 of 1 |
| APPLICATION NO. | : 17/527295 | |
| DATED | : May 14, 2024 | |
| INVENTOR(S) | : Zhixiang Chi et al. | |

It is certified that error appears in the above-identified patent and that said Letters Patent is hereby corrected as shown below:

In the Specification

In the description:

Column 10, Line 54:
"weights for prediction network (0')" should read --weights for prediction network ($\theta^P$)--

Signed and Sealed this
Sixth Day of August, 2024

Katherine Kelly Vidal
*Director of the United States Patent and Trademark Office*